July 4, 1967
G. W. DEMUTH
3,329,012
TORSION MEASURING DEVICE
Filed Nov. 8, 1963
2 Sheets-Sheet 1
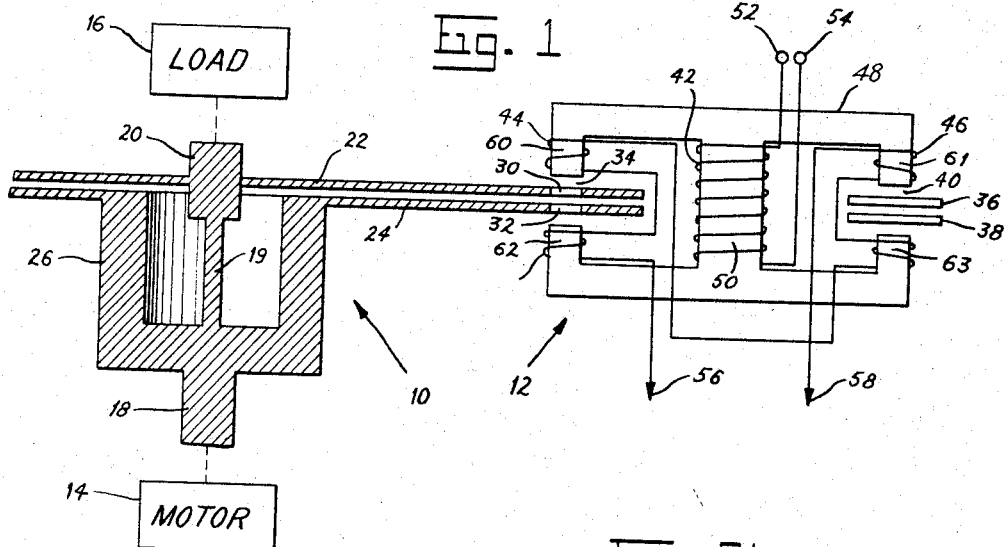
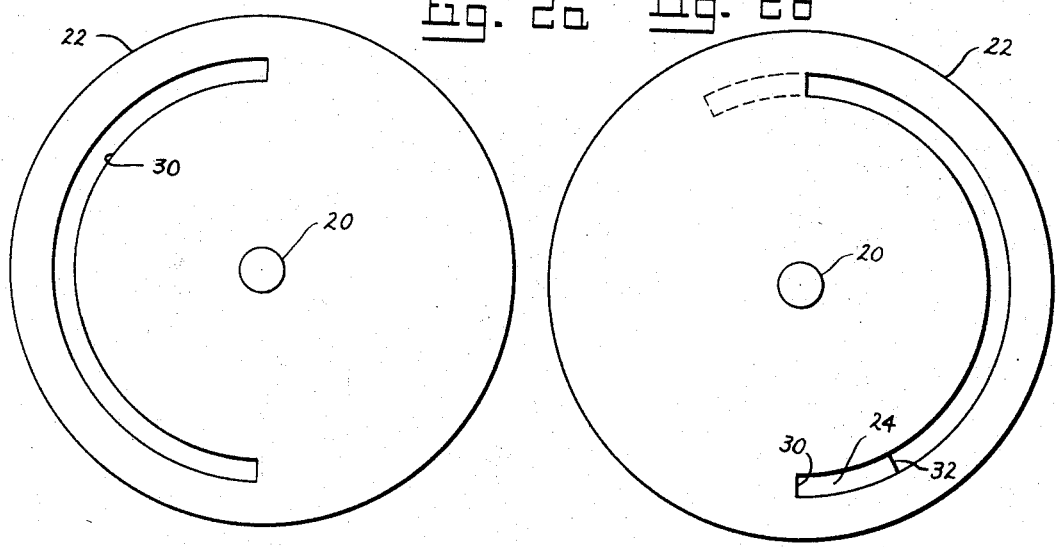
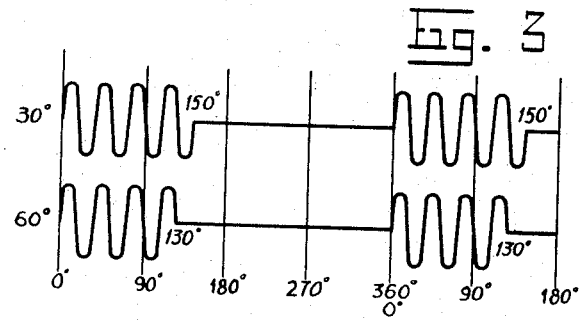
INVENTOR
GALAN W. DEMUTH
BY
*Edward M. Farrell*
ATTORNEY July 4, 1967  G. W. DEMUTH  3,329,012
TORSION MEASURING DEVICE Filed Nov. 8, 1963  2 Sheets-Sheet 2

United States Patent Office 3,329,012
Patented July 4, 1967

3,329,012
TORSION MEASURING DEVICE
Galan W. Demuth, Moorestown, N.J., assignor to Schaevitz Engineering, a corporation of New Jersey
Filed Nov. 8, 1963, Ser. No. 316,820
4 Claims. (Cl. 73—136)

This invention relates to torsion or torque devices and, more particularly, to means for measuring and controlling the torsion or torque of a device during operation.

Torque sensing devices are well known especially in connection with testing motors, rotating machine loads, and the like. Generally, a physical structure associated with the shaft of the motor being tested, for example, is designed to deform in a definite and repeatable manner under the application of load, force torque or pressure. Electrical strain gages have often been associated with the structure to provide a variable resistance corresponding to the torque being measured and other electrical transducer forms have also been used to sense such deformation. Such devices generally require slip-rings and brushes for connection to rotating parts.

In numerous other applications, it is desirable to know accurately the degree of torsion to which a device is being subjected during operation.

Also, in many other applications, where the breakdown or overload point of a device or material is known, it may be desirable to control the torsion to prevent breakdown or overload. This may be done by measuring the torsion involved and utilizing such measurements in combination with suitable servo mechanisms to control speed and/or driving force. Controlling torsional loading under severe environmental conditions, as in missiles, for example, is very important.

It is an object of this invention to provide a novel device for the measurement of torque in motors, and in rotating machines in general.

It is a further object of this invention to provide a novel torsion measuring device.

It is a further object of this invention to provide an improved torsion measuring device wherein the adjustment or calibration of the device is accomplished relatively easily.

In accordance with the present invention, a torsion or torque measuring and/or control device is provided. An elastic element, which may be an elastic mechanical structure, the torsion of which is to be measured or controlled, is adapted to be rotated about an axis. A pair of overlapping spaced rotor members are secured to this torsional element, one at the input or driven end, one at the output or driver end. These rotor members are moved within a magnetic air gap of a differential transformer. Each of said rotor elements include common magnetic means spaced substantially equal distances from the axis of rotation. A variation of the angular relationship of the pair of rotor elements with respect to each other causes an output signal from the differential transformer to be produced which corresponds to the torsion of the rotatable elastic element.

Other objects and advantages of the present invention will be apparent and suggest themselves to those skilled in the art from a reading of the following specification and claims in conjunction with the accompanying drawing, in which:

FIGURE 1 represents one embodiment of the present invention, partly, in schematic form;

FIGURES 2a and 2b represent views of the two discs or rotor elements of FIGURE 1 illustrated in different operating positions;

FIGURE 3 represents different output signals of the invention illustrated in FIGURE 1, corresponding to different magnitudes of torque;

Figure 4:
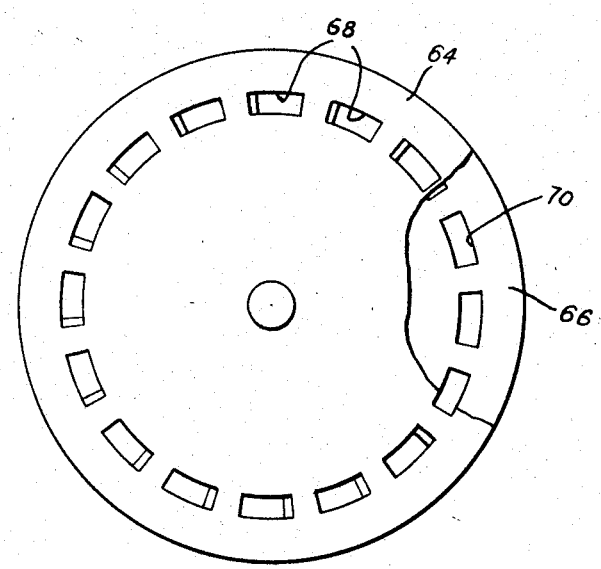
FIGURE 4 illustrates another form of discs which may be employed with the present invention.

Referring particularly to FIGURE 1, an elastic torsion or torque measuring device 10 is associated with a differential transformer 12. The device 10 is mechanically connected by suitable means between a motor 14 and a load 16.

An element or shaft 18 is connected to or may actually be the shaft of the motor 14, the torque of which is to be measured. A second shaft or element 20 is connected to the load 16. A flexure element 19 is connected between the shafts or elements 18 and 20.

A pair of metal discs 22 and 24, which may comprise any suitable magnetic or electrically conductive material, are physically mounted, the disc 22 being mounted to the shafts 20 and 18, respectively. The discs 22 and 24 each include similar types of somewhat elongated apertures 30 and 32, respectively. The discs may be copper, aluminum or other suitable conductive material.

The discs 22 and 24 are disposed to be driven by the motor 14 and to be rotated within an air gap 34 of the differential transformer 12. As the discs, including their overlapping air gaps, are driven through the air gap 34, the magnetic flux path within the air gap is varied each time the air apertures of the discs pass through the air gap with the duration of the variations varying in accordance with the degree of misalignment of the two apertures 30 and 32. A pair of null adjusting elements 36 and 38 may be provided within a second air gap 40 of the differential transformer 12, to provide a zero null or balance point. These null adjusting elements will ordinarily be of the same material, magnetic or conductive, as that of the discs. Convenient means for mechanically moving and fixing these null elements in position can be provided.

The differential transformer 12 includes a primary winding 42 and a pair of split secondary windings 44 and 46 connected in bucking relationship or series opposition. A core element 48 is provided with a central leg 50 with two pairs of pole pieces extending in opposite directions to form the air gaps 34 and 40. End pole pieces 60 and 62 form the air gap 34 and end pole pieces 61 and 63 form the air gap 40. Differential transformers have taken various different forms in the past with the basic functional operation being substantially the same in many cases.

Differential transformer transducers have been used in a variety of different forms for producing output electrical signals proportional to the displacement of a body. For example, a differential transformer transducer generally includes a movable element member adapted to be moved in accordance with a measured function, with the element being disposed between primary and secondary coils of the transformer to vary the magnetic coupling therebetween. The element is generally metal and provides a path for magnetic flux linking the coils. The secondary coils of many conventional differential transformer transducers generally includes a pair of substantially similar windings which are connected to each other in series opposition or bucking relationship.

In the normal operation of such differential transformers, the primary coil is generally energized with alternating current, with electrical signals being induced in the two secondary coils. Because the two secondary coils are connected in series opposition, the two voltages induced in the two coils are opposite in phase and the net output of the transformer is the difference of the voltages induced in the two secondary coils. For one position of the movable element or core, equal voltages are induced in the two secondary coils, resulting in a net zero output voltage. When the movable element or core is positioned for zero output volts, it is said to be at the balance point or null position.

When the movable element or core is moved away from the null position, the voltage induced in the secondary coil towards which the core is moved increases, while the voltage induced in the secondary coil from which the core is moved decreases. These variations in induced voltages are due to the variations in the magnetic flux path between the primary coil and the respective secondary coils caused by the relative movement of the core member. When the core member is thus moved from its null position, a differential output voltage across the output circuit of the transformer results. With proper design, the output voltage from the transformer varies linearly with a change in the core position as long as the core is operating within its linear range. Motion of the core member in the opposite direction beyond the null position produces a similar voltage characteristic across the output circuit of the transformer, but with the phase shifted 180°. The differential transformer 12 operates substantially the same as many conventional differential transformers, with the main difference being in the type of movable elements used and the manner in which they are used.

An alternating signal may be applied to input terminals 52 and 54. The frequency of this signal may vary widely. The output signal from the secondary windings 44 and 46 are taken from output terminals 56 and 58.

The output signal at the terminals 56 and 58 is normally adjusted to zero or as close thereto as practical prior to using the device for measurements or control. This may be accomplished, for example, by having the solid portions of the discs 22 and 24 disposed within the air gap 34 when the discs are stationary. Elements 36 and 38, which may be of the same type of material and thickness as the discs 22 and 24, may then be inserted into the air gap 40 and moved until a null balancing point is reached, i.e. substantially zero volts is at the terminals 56 and 58.

During operation, the degree of torsion or torque between the motor 14 and the load 16 is reflected in the degree of flexing or twisting of the flexure element 19. As the flexure element 19 is subjected to torque or torsion, the relative positions of the apertures 30 and 32 varies.

FIGURE 2a illustrates a top view of the disc 22 with substantially no torsion existing within the flexure element 19. The apertures 30 and 32 are aligned with respect to each other. FIGURE 2b illustrates a top view of the plate 22 slightly displaced with respect to the plate 24. It is seen that the two plates 22 and 24 are disposed at slightly different angles with respect to each other with their apertures overlapping. This indicates that torsion exists within the flexure element 19. The greater the angular displacement of the apertures 30 and 32 with respect to each other, the greater the torsion in the flexure element 19.

It may be seen that the apertures 30 and 32 are equally distanced from a common axis of the shafts 18 and 20. The apertures 30 and 32 are normally aligned with respect to each other. When the discs 22 and 24 are angularly displaced with respect to each other, the total openings between the two apertures 30 and 32 may be said to diminish.

The discs 22 and 24 affect the magnetic gap between pole pieces 60 and 62. When the solid magnetic portions of both discs 22 and 24 are moving between the pole pieces, the output signal at the terminals 56 and 58 will be substantially zero. On the other hand, when the apertures 30 and 32 are passing between the pole pieces 60 and 62, the degree of magnetic coupling between the pole pieces 60 and 62 will be less if the discs are made of magnetic material of good permeability. This open aperture coupling will be more if the discs are made of highly conductive material such as copper or aluminum, since (highly) conductive material acts as a barrier to alternating magnetic fields. The open aperture coupling between pole pieces 60 and 62 produces an unbalanced condition between the two secondary windings 44 and 46 thereby producing an output signal at the terminals 56 and 58.

The nature of the signal at the terminals 56 and 58 will vary in accordance with the angular difference or overlap between the apertures 30 and 32. In FIGURE 3, for example, a variation of thirty degrees may produce an output signal of one duration while a variation of sixty degrees will produce an output signal of longer duration. It is understood that the signals of FIGURE 3 are merely illustrative.

The duration of the signals may be measured by suitable means to determine the angular displacement of the apertures with respect to each other. An average D.C. voltage, representative of the angular displacement may be provided by suitable rectification or demodulation. This average voltage will be dependent upon the amplitude and duration of the output signal.

Referring particularly to FIGURE 4, a different pair of discs 64 and 66 include a plurality of apertures 68 and 70, respectively.

As illustrated in FIGURE 1, the discs 64 and 66 may be disposed to move within an air gap of a differential transformer to vary the magnetic flux path therein between split secondary windings. While the basic operation using the discs of FIGURE 4 is similar to the operation described in connection with FIGURE 1, the type of output signal will be somewhat different such as illustrated in FIGURE 6.

It is seen that the angular displacement of the discs is continuously being measured rather than a measurement once per revolution of the discs.

Figure 6:
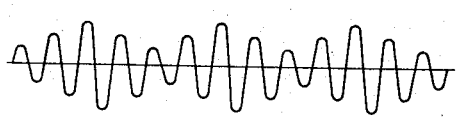
FIGURE 6 illustrates the type of signal output when the discs of FIGURES 4 and 5 are used with the present invention.

The waveform illustrated in FIGURE 6 is an A.C. modulated signal. This signal may be rectified and filtered by suitable conventional means which provide an average direct current signal. The D.C. signal may represent the angular displacement of the apertures 68 of the disc 64 with respect to the apertures 70 of the disc 66. The response speed and accuracy of a device using the discs of FIGURE 4 will be improved because of the higher modulation frequency since repeated indications of angular displacements are obtainable for the entire circumference of the discs rotations rather than one indication per revolution of the discs.

Figure 5:
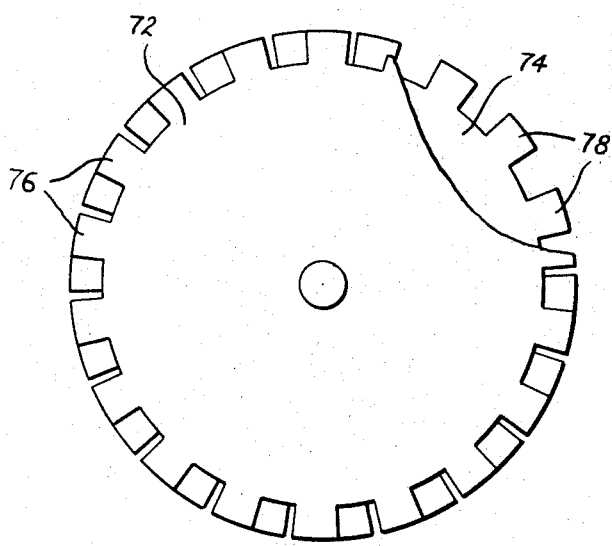
FIGURE 5 represents still another form of discs which may be employed with the present invention.

Referring particularly to FIGURE 5, another form of discs are illustrated. The discs 72 and 74 include teeth 76 and 78, respectively having notches or air gaps therebetween. The discs 72 and 74 may be used in the arrangement described in connection with FIGURE 1. The output signal will be an A.C. modulated signal such as illustrated in FIGURE 6. Use of the discs of FIGURE 5 provides basically the same relative advantages as used in the discs of FIGURE 4.

It should be recognized that the zero torque output of the device can correspond to different initial adjustments of the signal with different relative disc positions than described in the foregoing specification, depending on particular application needs.

The system may be arranged to show torque in both directions in different ways as in reversible drive systems, or when driving and braking from the same source.

For example, the apertures may be positioned for fifty percent overlap at zero torque, at which the rotation will produce a modulated signal output which in turn may produce an intermediate level of average D.C. output from the demodulator or rectifier. This D.C. output will produce an instrument scale position for zero torque. The calibrated torque values can then be both positive and negative, with higher and lower D.C. output signals to correspond, above and below the zero-torque calibration point.

Or, modifying this adjustment just described, the null-balancing gap may be adjusted to produce an average D.C. output of zero for rotation with fifty percent aperture overlap. In this case a phase sensitive demodulator could be used to produce a positive average D.C. signal from torque in one direction from an increased aperture overlap for example, and a negative average D.C. signal from torque in the other direction, from decreased aperture overlap, for example.

The torque sensing device may not, in some cases, be highly linear in response when using short uniform apertures of simple geometry as shown in FIGURES 4 and 5. Linearity can be improved by empirical change in the aperture outline in such cases.

The present invention has provided an improved torque of torsion measuring and control device which provides a highly accurate linear output signal. Relatively simple means may be employed in initially calibrating the device.

What is claimed is:

1. A device for measuring torsion in an elastic element comprising a differential transformer having a primary winding and a pair of secondary windings connected in series opposition, said differential transformer having a first air gap and a second air gap with a balancing element disposed within said second air gap, said first air gap being included in a magnetic path of one of said pair of secondary windings and said second air gap being included in a magnetic path of the other of said pair of secondary windings, a pair of members connected to either side of said elastic element disposed to be moved within a magnetic coupling path within the first air gap of said differential transformer to control an output signal therefrom, each of said members having sectors for increasing or decreasing said magnetic coupling path as they are moved within said coupling path within said first air gap, means for rotating said members whereby a torsion within said elastic element varies the relative positions of said members with respect to each other to produce an output signal at said differential transformer corresponding to the torsion within said elastic element.

2. In combination with a differential transformer having two air gaps therein, a pair of discs disposed within one of said air gaps, a null positioning element disposed in the other air gap, said pair of discs each having an air slot therein in substantial alignment with respect to each other, a flexure element connected between said pair of discs, and means for rotating said discs within said air gap, said flexure element being responsive to a torsion force to cause the alignment of said slot openings to vary with respect to each other.

3. In combination with a differential transformer having two air gaps therein, a pair of discs disposed within one of said air gaps, a null positioning element disposed in the other air gap, said pair of discs each having toothed areas about their peripheries, a flexure element connected between said pair of discs, means for rotating said discs within said air gap, said flexure element being responsive to a torsion force to cause the alignment of said toothed areas to vary with respect to each other.

4. A torsion measuring device comprising a movable elastic element adapted to be moved about an axis, a pair of spaced members secured to said movable elastic element to be moved therewith, each of said members having an aperture therein spaced substantially equal distances from said axis, a differential transformer having an air gap to produce output signals in accordance with a magnetic path within said air gap, and means for rotating said elastic element and said mmebers about said axis with said apertures within said air gap to comprise said magnetic path, a torsion in said elastic element causing a change in the relative positions of the apertures of said members to vary said magnetic path to produce output signals from said differential transformer corresponding to said torsion in said elastic element.

References Cited
UNITED STATES PATENTS

| | | | |
|---|---|---|---|
| 2,457,700 | 12/1948 | Martin et al. | 73—136 |
| 2,826,064 | 3/1958 | Hastings | 73—136 |

FOREIGN PATENTS

| | | |
|---|---|---|
| 393,174 | 3/1924 | Germany. |
| 1,135,367 | 12/1956 | France. |
| 902,770 | 8/1962 | Great Britain. |

RICHARD C. QUEISSER, *Primary Examiner.*

JAMES J. GILL, C. A. RUEHL, *Examiners.*